(12) United States Patent
Lamers et al.

(10) Patent No.: US 11,440,390 B2
(45) Date of Patent: Sep. 13, 2022

(54) ELECTRICAL DRIVE UNIT AND ALSO DRIVE ARRANGEMENT FOR AN ELECTRICAL DRIVE UNIT

(71) Applicant: SCHAEFFLER TECHNOLOGIES AG & CO. KG, Herzogenaurach (DE)

(72) Inventors: Johannes Lamers, Sasbach (DE); Rolf Meinhard, Bühl (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 164 days.

(21) Appl. No.: 16/677,398

(22) Filed: Nov. 7, 2019

(65) Prior Publication Data

US 2020/0139801 A1     May 7, 2020

(30) Foreign Application Priority Data

Nov. 7, 2018    (DE) ......................... 102018127710.5

(51) Int. Cl.

| | |
|---|---|
| *B60K 1/00* | (2006.01) |
| *F16H 41/04* | (2006.01) |
| *F16H 41/30* | (2006.01) |
| *F16H 41/02* | (2006.01) |
| *B60K 17/10* | (2006.01) |
| *F16H 57/04* | (2010.01) |
| *H02K 9/19* | (2006.01) |
| *H02K 7/00* | (2006.01) |
| *H02K 7/10* | (2006.01) |

(Continued)

(52) U.S. Cl.
CPC ............... *B60K 1/00* (2013.01); *B60K 17/02* (2013.01); *B60K 17/06* (2013.01); *B60K 17/16* (2013.01); *F16H 41/04* (2013.01); *F16H 41/30* (2013.01); *F16H 45/02* (2013.01); *F16H 57/0441* (2013.01); *H02K 7/006* (2013.01); *H02K 7/10* (2013.01); *H02K 7/108* (2013.01); *H02K 9/19* (2013.01); *B60K 2001/006* (2013.01)

(58) Field of Classification Search
CPC .......... B60K 1/00; B60K 17/02; B60K 17/06; B60K 17/16; F16H 41/04; F16H 41/30; F16H 45/02; F16H 57/0441; H02K 7/006; H02K 7/10; H02K 7/108; H02K 9/19

See application file for complete search history.

(56) References Cited

U.S. PATENT DOCUMENTS 3,951,008 A * 4/1976 Schneider ............... F16H 35/18
                                                      74/661
4,079,820 A * 3/1978 Mattli .................... F16D 27/115
                                                    192/3.21

(Continued)

*Primary Examiner* — Tinh Dang

(57) ABSTRACT

An electrical drive unit for an electrically at least partially driveable motor vehicle and also to a drive arrangement for an electrically at least partially driveable motor vehicle, comprising an electrical drive unit according to the disclosure. An electrical drive unit for an electrically at least partially driveable motor vehicle comprises an electrical drive machine and also an output device for transmitting a torque, which is provided by the electrical drive machine, to driven vehicle wheels of a motor vehicle, and also comprising a torque converter, which is arranged in the torque transmission path between a rotor of the electrical drive machine and the output device, for the purpose of matching the torque which is provided by the electrical drive machine to a respective torque requirement.

20 Claims, 1 Drawing Sheet

(51) Int. Cl.
*H02K 7/108* (2006.01)
*F16H 45/02* (2006.01)
*B60K 17/02* (2006.01)
*B60K 17/16* (2006.01)
*B60K 17/06* (2006.01)

(56) References Cited

U.S. PATENT DOCUMENTS

| | | | | |
|---|---|---|---|---|
| 6,328,123 B1* | 12/2001 | Niemann | | F16D 55/40 |
| | | | | 180/65.51 |
| 7,645,207 B2* | 1/2010 | Kamm | | F16H 3/666 |
| | | | | 475/275 |
| 7,810,592 B2* | 10/2010 | Klemen | | B60L 50/16 |
| | | | | 180/65.225 |
| 8,251,849 B2* | 8/2012 | Holmes | | B60K 6/365 |
| | | | | 475/5 |
| 8,500,586 B2* | 8/2013 | Harif | | F16H 61/64 |
| | | | | 475/72 |
| 8,974,339 B2* | 3/2015 | Ideshio | | F16H 41/24 |
| | | | | 475/5 |
| 8,991,576 B2* | 3/2015 | Sperrfechter | | B60K 6/48 |
| | | | | 192/3.26 |
| 9,140,346 B2* | 9/2015 | Steinberger | | F16D 41/063 |
| 9,476,491 B2* | 10/2016 | Boley | | F16H 45/02 |
| 9,494,220 B2* | 11/2016 | Gibbs | | F16H 45/02 |
| 9,634,597 B2* | 4/2017 | Venter | | F16H 61/60 |
| 9,856,947 B2* | 1/2018 | Beck | | F16H 3/66 |
| 10,294,912 B2* | 5/2019 | Amano | | F03B 13/264 |
| 2007/0232438 A1* | 10/2007 | Kamm | | F16H 3/666 |
| | | | | 475/275 |
| 2008/0060859 A1* | 3/2008 | Klemen | | B60L 50/16 |
| | | | | 180/65.25 |
| 2010/0130322 A1* | 5/2010 | Harif | | B23B 31/38 |
| | | | | 475/59 |
| 2010/0160103 A1* | 6/2010 | Holmes | | B60K 6/547 |
| | | | | 475/140 |
| 2013/0074335 A1* | 3/2013 | Amano | | F03B 17/061 |
| | | | | 29/889 |
| 2014/0144742 A1* | 5/2014 | Sperrfechter | | B60K 6/405 |
| | | | | 192/3.29 |
| 2014/0251744 A1* | 9/2014 | Steinberger | | F16H 45/02 |
| | | | | 192/3.25 |
| 2014/0256506 A1* | 9/2014 | Ideshio | | B60W 10/023 |
| | | | | 477/5 |
| 2015/0345604 A1* | 12/2015 | Boley | | F16H 45/02 |
| | | | | 192/3.29 |
| 2016/0053865 A1* | 2/2016 | Beck | | F16H 3/66 |
| | | | | 475/275 |
| 2016/0065106 A1* | 3/2016 | Venter | | F16H 45/02 |
| | | | | 290/31 |
| 2016/0109010 A1* | 4/2016 | Lindemann | | F16H 41/28 |
| | | | | 192/3.21 |
| 2016/0109011 A1* | 4/2016 | Gibbs | | F16H 45/02 |
| | | | | 192/3.25 |

* cited by examiner

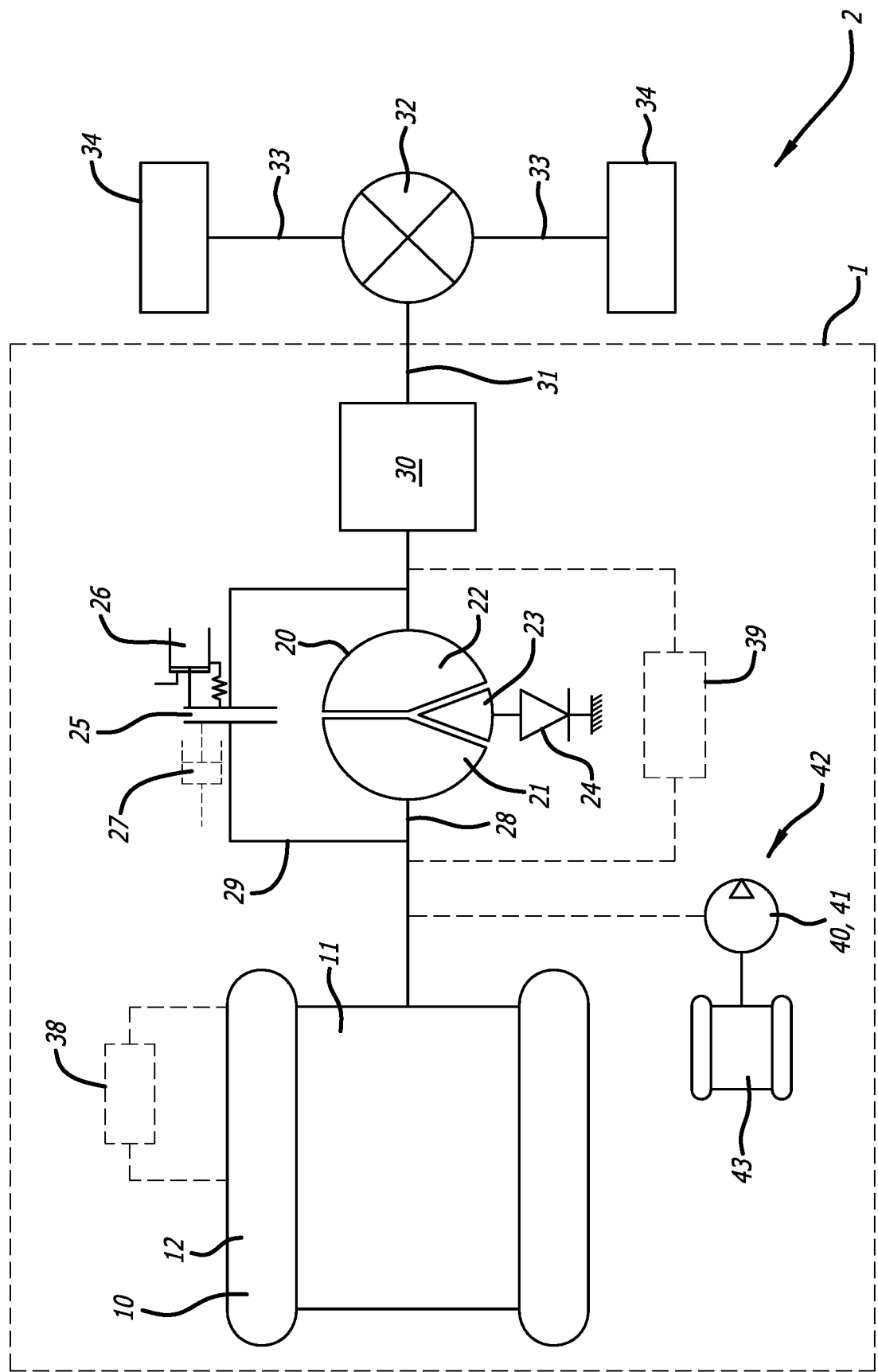

ELECTRICAL DRIVE UNIT AND ALSO DRIVE ARRANGEMENT FOR AN ELECTRICAL DRIVE UNIT

CROSS-REFERENCE TO RELATED APPLICATIONS

This application claims priority to DE 102018127710.5 filed Nov. 7, 2018, the entire disclosures of which are incorporated by reference herein.

TECHNICAL FIELD

The disclosure relates to an electrical drive unit for an electrically at least partially driveable motor vehicle and also to a drive arrangement for an electrically at least partially driveable motor vehicle, comprising an electrical drive unit according to the disclosure.

BACKGROUND

The prior art discloses electrical drive units which comprise electrical drive machines. However, these electrical drive machines usually have a relatively small spread.

Various approaches to solving this problem are known.

For example, it is known to design the electrical drive machine to be very large, as a result of which the torque range which can be implemented by the electrical drive machine is extended. However, this accordingly involves increased installation space requirements, a higher weight and also increased investment, including in respect of the power electronics.

Furthermore, it is known to connect a transmission unit to the electrical drive machine, with the transmission unit implementing a plurality of transmission stages, so that an output torque can be implemented in accordance with the necessary torque requirements. However, transmission units of this kind are usually associated with losses in respect of convenience for a driver of a motor vehicle which is equipped with the known electrical drive unit or with a relatively complicated design on account of the disconnection of the torque transmission path required during shifting.

Continuously variable transmission units are also relatively complex in respect of their design and require a large amount of installation space.

In addition, it is known when using an electrical drive unit in a hybrid drive unit to decouple the electrical drive machine if the rotation speed range thereof no longer meets the rotation speed requirements, and to allow an internal combustion engine to provide the required rotation speed. However, this leads to a restriction in the use of the torque which is provided by the electrical machine.

SUMMARY

Proceeding from this, the object of the present disclosure is to provide an electrical drive unit and a drive arrangement for an electrical drive unit which render it possible to combine a wide range of applications of the electrical drive machine with optimum driving operation of a motor vehicle which is equipped with said electrical drive machine with a low investment requirement.

The object is achieved by the electrical drive unit according to the disclosure described below. Advantageous refinements of the electrical drive unit are specified alternative embodiments of the disclosure described below. In addition, a drive arrangement for an electrical drive unit, which drive arrangement has the electrical drive unit according to the disclosure below is provided.

The features of the embodiments can be combined in any technically appropriate way, it also being possible to this end for the explanations from the following description and features from the figures which comprise supplementary refinements of the disclosure to be added.

The disclosure relates to an electrical drive unit for an electrically at least partially driveable motor vehicle, comprising an electrical drive machine and also an output device for transmitting a torque, which is provided by the electrical drive machine, to driven vehicle wheels of a motor vehicle. The electrical drive unit furthermore comprises a torque converter, which is arranged in the torque transmission path between a rotor of the electrical drive machine and the output device, for the purpose of matching the torque which is provided by the electrical drive machine to a respective torque requirement.

Owing to the arrangement of the torque converter, it is possible to operate said torque converter in a so-called slip mode, where the rotation speed of the pump side is higher than the rotation speed of the turbine side. This renders it possible to relatively easily increase the rotation speed on the pump side and to provide a correspondingly increased torque on the turbine side. In this way, it is possible to respond to an increased torque requirement in a simple manner by adjusting the torque converter and, respectively, to also ensure an increased torque at relatively high rotation speeds of the electrical drive machine. Similarly, a sufficient torque can also be implemented at very low rotation speeds of the electrical drive machine, such as during start-up for example.

Accordingly, a further torque range can be covered by the electrical drive unit according to the disclosure than is provided by the electrical drive machine alone.

According to a further aspect of the disclosure, a clutch for disconnecting and opening the torque transmission path between the electrical drive machine and the output device is arranged parallel to the torque converter.

In particular, this clutch is designed as a friction clutch, a so-called lock-up clutch, with which a rotationally fixed connection of the two clutch sides and accordingly the two sides of the torque transmission path which are to be connected to one another can be realized in the closed state.

This clutch is advantageously designed as a normally closed clutch.

However, depending on the application, the use of a normally open clutch, or else a clutch which stays in its respective clutch position in the unoperated state, that is to say as a so-called normally stay clutch, should not be precluded.

In one advantageous embodiment of the disclosure, a step-up transmission for stepping up the torque which is provided by the torque converter is arranged in the torque transmission path between the torque converter and the output device.

In particular, provision is made for this transmission to implement an unchangeable transmission ratio, that is to say to not be designed as a variable-speed transmission, but even this refinement should not be precluded from the implementation of the disclosure.

In one embodiment according to the disclosure, provision is made for the torque converter to be a Trilok converter.

In a converter of this kind, the guide wheel is mounted on a freewheel, so that the converter automatically switches over to purely hydrodynamic coupling. Said converter is configured in such a way that the guide wheel jointly rotates freely after the switchover, so that a torque can no longer be supported and the input and output torque are the same.

This embodiment of the torque converter additionally has the advantage that there is an only low installation space requirement for the torque converter, in particular with a torsional vibration damper being dispensed with.

In an alternative embodiment, a so-called Fottinger converter of Lysholm design with a turbine through which fluid flows from the inside to the outside or else a reverse rotation converter, also known as a DIW converter, can also be used instead of a TRILOK converter.

According to a further advantageous embodiment, the electrical drive unit furthermore comprises an electrically driveable pump which is flow-connected to the flow chamber of the torque converter for the purpose of ensuring a minimum pressure of a fluid in the flow chamber of the torque converter or for assisting in implementing a minimum pressure of a fluid in the flow chamber of the torque converter.

In this embodiment, the pump is accordingly driven by an electric pump motor which is provided separately.

According to a further embodiment, the electrical drive unit furthermore comprises a mechanically driveable pump which is mechanically coupled to the pump impeller or to the turbine wheel of the torque converter and is flow-connected to the flow chamber of the torque converter for the purpose of ensuring a minimum pressure of a fluid in the flow chamber of the torque converter or for assisting in implementing a minimum pressure of a fluid in the flow chamber of the torque converter.

Thus, in an alternative embodiment to the electrically driveable pump or else in addition, the torque converter itself comprises a pump which is mechanically connected to the pump impeller or to the turbine wheel of the torque converter, and accordingly is driven by the torque converter, for ensuring a minimum pressure of a fluid in the flow chamber of the torque converter or for assisting in implementing a minimum pressure of a fluid in the flow chamber of the torque converter.

The pump serves to supply the torque converter with fluid, in particular with oil, as a result of which cooling of the torque converter is implemented at the same time.

In addition, the electrical drive unit can be configured in such a way that operation of the clutch can be implemented by the pump.

In a simple and stable embodiment, the electrical drive unit furthermore comprises a cooling circuit which is designed to dissipate heat from the electrical drive machine and also from the torque converter.

Thus, the electrical drive machine and also the torque converter are constituent parts of the same cooling circuit, and therefore further assemblies of the cooling circuit are accordingly efficiently used. In addition, this common cooling circuit has the advantage that operation-related heating phenomena occur alternately with respect to time in the electrical drive machine and also in the torque converter, so that reliable cooling of both assemblies is ensured by the common cooling circuit with a low level of expenditure on equipment.

In an alternative embodiment, the electrical drive unit furthermore comprises a first cooling circuit 38 which is designed to dissipate heat from the electrical drive machine, and/or comprises a second cooling circuit 39 which is designed to dissipate heat from the torque converter.

In this embodiment, the performance of a respective cooling circuit 38, 39 can be optimally matched to the thermal conditions prevailing on or in the electrical drive device and to the thermal conditions prevailing in or on the torque converter.

In this case, the pump, also called the oil pump, can be a constituent part of the cooling circuit in which the torque converter is incorporated. In this respect, the electrical drive machine is also incorporated in this cooling circuit, and therefore the pump also serves to cool the electrical drive machine indirectly.

According to a further embodiment, the electrical drive unit furthermore comprises a lubrication system by way of which lubricant can be supplied to the step-up transmission, where the pump for generating a lubricant volumetric flow is a constituent part of the lubrication system.

Thus, in this embodiment, the pump which is associated with the torque converter has a multiple function, specifically of supplying the torque converter, possibly assisting the cooling function and also supplying the step-up transmission with lubricant.

Furthermore, the disclosure provides a drive arrangement for an electrically at least partially driveable motor vehicle, which drive arrangement comprises an electrical drive unit according to the disclosure, where the drive arrangement furthermore has an axle which is mechanically coupled to the output device.

The output device is embodied, in particular, as an output shaft, the rotation axis of which corresponds substantially to the torque transmission path of the electrical drive unit according to the disclosure.

In one advantageous embodiment of the drive arrangement, said drive arrangement furthermore comprises a differential transmission, which is mechanically coupled to the output device of the electrical drive unit at one end and is mechanically coupled to the axle at the other end, for the purpose of torque transmission from the electrical drive unit to the axle.

BRIEF DESCRIPTION OF THE DRAWINGS

The disclosure described above will be explained in more detail below in relation to the relevant technical background with reference to the associated drawing which shows a preferred refinement. The disclosure is in no way restricted by the purely schematic drawing, and it should be noted that the exemplary embodiment shown in the drawing is not restricted to the dimensions illustrated. In the drawing FIG. 1: shows a schematic illustration of a drive arrangement according to the disclosure comprising a drive unit according to the disclosure.

DETAILED DESCRIPTION

The drive arrangement 2 comprises an electrical drive unit 1, a differential transmission 32 which is mechanically coupled to the electrical drive unit 1, and also an axle 33 which is coupled to the differential transmission 32 and on which vehicle wheels 34 are arranged in a rotationally fixed manner.

The electrical drive unit 1 comprises an electrical drive machine 10, which is substantially an electric motor, a torque converter 20 and also an output device 31 which implements the mechanical coupling between the electrical drive unit 1 and the differential transmission 32, so that torque which is provided by the electrical drive machine 10 can be transmitted to the vehicle wheels 34.

In this case, a first torque transmission path between the electrical drive unit 10 and the output device 31 is implemented via the torque converter 20.

A clutch 25 is arranged parallel to the torque converter 20. A second torque transmission path between the electrical drive machine 10 and the output device 31 can be implemented via this clutch 25, where the clutch 25 is designed to open or to disconnect the second torque transmission path.

The electrical drive machine 10 has a rotor 11 and also a stator 12, wherein the rotor 11 is arranged such that it can rotate relative to the stator 12 and is mechanically coupled to an input side 28 of the torque converter 20 and, respectively, to an input side 29 of the clutch 25 for transmitting torque.

A step-up transmission 30 is arranged downstream of the torque converter 20 and, respectively, downstream of the clutch 25 in the torque transmission path between the electrical drive machine 10 and the output device 31, for stepping up torque which is provided by the torque converter 20 and/or by the clutch 25.

The torque converter 20 comprises a pump impeller 21, a trubine wheel 22, a guide wheel 23 and also a freewheel 24. In respect of its design and its functioning, the torque converter 20 therefore corresponds substantially to a so-called TRILOK converter.

The guide wheel 23 is mounted on the freewheel 24, so that the torque converter 20 automatically switches over to purely hydrodynamic coupling. Said torque converter is configured in such a way that the guide wheel 23 jointly rotates freely after the switchover, so that a torque can no longer be supported and the input and output torque are the same.

The pump impeller 21 is mechanically coupled to the rotor 11 of the electrical machine 10, and the turbine wheel 22 is mechanically coupled to the step-up transmission 30.

The torque converter 20 can be operated in a so-called slip mode, where the rotation speed of the pump impeller 21 can be increased on account of torque differences which occur between the two wheels 21, 22. Accordingly, a correspondingly increased torque can be provided at the turbine wheel 22. Therefore, it is possible to respond to a torque requirement at the output device 31 and, respectively, the vehicle wheels 34 in a simple manner by adjusting the torque converter 20 and, respectively, to also provide an increased torque due to relatively high rotation speeds of the electrical drive machine 10.

Here, the clutch 25 is configured in a normally closed clutch form 26. An alternative which is embodied by a normally open clutch form 27 of the clutch 25 is illustrated using dashed lines. An embodiment of the clutch 25 as a so-called normally stay clutch, which can likewise be used as an alternative to the normally closed clutch form 26, is not illustrated.

Furthermore, FIG. 1 shows a pump 40, 41. Said pump is embodied either as an electrically driveable pump 40 which can be driven by an electric pump motor 43; or as a mechanically driveable pump 41 which can be driven by torque which is provided by the electrical drive machine 10. The pump 40, 41 is designed to ensure the supply of the torque converter 20 with fluid, in particular with oil, and therefore to ensure a minimum pressure of a fluid in the flow chamber of the torque converter 20 or to assist in realizing a minimum pressure of this kind. At the same time or as an alternative, cooling of the torque converter 20 is realized by the pump 40, 41.

In addition, the pump 40, 41 can be used for operating the clutch 25.

In this case, the pump 40, 41 is part of a lubrication system 42 by way of which lubricant can be supplied to the step-up transmission 30.

During operation of a motor vehicle which comprises the drive arrangement 2 according to the disclosure, torque which is provided by the electrical drive machine 10 can be transmitted to the step-up transmission 30 via the torque converter 20 or the clutch 25 and then to the differential transmission 32 by the output device 31 and can be transmitted from there to the axle 33 and finally to vehicle wheels 34.

Since the torque which is provided by the electrical drive machine 10 can be transmitted firstly via the torque converter 20 and, if required, directly via the clutch 25, a further torque range can be covered by the electrical drive unit 1 according to the disclosure than is provided by the electrical drive machine 10 alone owing to the torque variation by the torque converter 20.

The refinement according to the disclosure of the electrical drive unit and a drive arrangement proposed here renders it possible to combine a wide range of applications of the electrical drive machine with optimum driving operation of a motor vehicle which is equipped with said electrical drive machine with a low investment requirement.

LIST OF REFERENCE SYMBOLS

1 Electrical drive unit
2 Drive arrangement
10 Electrical drive machine
11 Rotor
12 Stator
20 Torque converter
21 Pump impeller
22 Turbine wheel
23 Guide wheel
24 Freewheel
25 Clutch
26 Normally closed clutch form
27 Normally open clutch form
28 Input side of the torque converter
29 Input side of the clutch
30 Step-up transmission
31 Output device
32 Differential transmission
33 Axle
34 Vehicle wheel
40 Electrically driveable pump
41 Mechanically driveable pump
42 Lubrication system
43 Electric pump motor

What is claimed is:

1. An electrical drive unit for an electrical motor vehicle, comprising:
 an electrical drive machine;
 an output device for transmitting a torque provided by the electrical drive machine, to drive vehicle wheels of the electrical motor vehicle;
 a torque converter, arranged in a torque transmission path between a rotor of the electrical drive machine and the output device, wherein the torque converter is configured to match the torque provided by the electrical drive machine to a respective torque requirement;
 a first cooling circuit which is designed to dissipate heat from the electrical drive machine; and
 a second cooling circuit which is designed to dissipate heat from the torque converter.

2. The electrical drive unit of claim 1, wherein a clutch for disconnecting and opening the torque transmission path between the electrical drive machine and the output device is arranged parallel to the torque converter.

3. The electrical drive unit of claim 2, wherein a step-up transmission for stepping up the torque which is provided by the clutch is arranged in the torque transmission path between the clutch and the output device.

4. The electrical drive unit of claim 1, wherein the torque converter further includes a guide wheel and a freewheel.

5. The electrical drive unit of claim 1, wherein the electrical drive unit furthermore comprises an electrically driveable pump which is flow-connected to a flow chamber of the torque converter, wherein the flow chamber is configured to maintain a minimum pressure of a fluid in the flow chamber of the torque converter or for assisting in implementing a minimum pressure of a fluid in the flow chamber of the torque converter.

6. The electrical drive unit of claim 1, wherein the electrical drive unit furthermore comprises a mechanically driveable pump which is mechanically coupled to a pump impeller or to a turbine wheel of the torque converter and is flow-connected to a flow chamber of the torque converter, wherein the flow chamber is configured to maintain a minimum pressure of a fluid in the flow chamber of the torque converter or for assisting in implementing a minimum pressure of a fluid in the flow chamber of the torque converter.

7. The electrical drive unit of claim 3, wherein the electrical drive unit furthermore comprises a lubrication system by way of which lubricant can be supplied to the step-up transmission, wherein a pump configured to generate a lubricant volumetric flow is a constituent part of the lubrication system.

8. The electrical drive unit of claim 7, wherein the electrical drive unit includes an axle which is mechanically coupled to the output device.

9. An electrical drive unit, comprising:
an electrical drive machine;
an output device for transmitting a torque provided by the electrical drive machine to drive vehicle wheels of a motor vehicle;
a torque converter arranged in a torque transmission path between a rotor of the electrical drive machine and the output device, wherein the torque converter is configured to match the torque provided by the electrical drive machine to a respective torque requirement;
a step-up transmission for stepping up the torque which is provided by the torque converter being arranged between the torque converter and the output device;
a first cooling circuit which is designed to dissipate heat from the electrical drive machine; and
a second cooling circuit which is designed to dissipate heat from the torque converter.

10. The electrical drive unit of claim 9, wherein the electrical drive unit includes a clutch configured to disconnect and open the torque transmission path between the electrical drive machine and the output device.

11. The electrical drive unit of claim 10, wherein the clutch is arranged parallel to the torque converter.

12. The electrical drive unit of claim 9, wherein the torque converter is configured to operate in a slip mode configured to allow rotation speed of a pump side to be higher than the rotation speed of a turbine side.

13. The electrical drive unit of claim 9, wherein the electrical drive unit includes a mechanically drivable pump mechanically coupled to a pump impeller or to the turbine wheel of the torque converter.

14. The electrical drive unit of claim 13, wherein the mechanically drivable pump is configured to be flow-connected to a flow chamber of the torque converter and configured to provide a minimum pressure of a fluid in the flow chamber of the torque converter.

15. The electrical drive unit of claim 9, wherein the electrical drive unit includes a differential transmission mechanically coupled to the output device of the electrical drive unit at one end and is mechanically coupled to an axle at the other end, wherein the differential transmission is configured to transmit torque from the electrical drive unit to the axle.

16. An electrical drive unit, comprising:
an electrical drive machine;
an output shaft for transmitting a torque configured to drive vehicle wheels of a motor vehicle, the output shaft including a rotation axis corresponding to a torque transmission path of the electrical drive unit; and
a torque converter arranged in the torque transmission path between a rotor of the electrical drive machine and the output shaft, wherein the torque converter is configured to match the torque provided by the electrical drive machine to a respective torque requirement;
a first cooling circuit which is designed to dissipate heat from the electrical drive machine; and
a second cooling circuit which is designed to dissipate heat from the torque converter.

17. The electrical drive unit of claim 9, further comprising an electrically driveable pump flow-connected to a flow chamber of the torque converter, wherein the flow chamber is configured to maintain a minimum pressure of a fluid in the flow chamber of the torque converter or for assisting in implementing a minimum pressure of a fluid in the flow chamber of the torque converter.

18. The electrical drive unit of claim 1, wherein the torque converter is configured to operate in a slip mode configured to allow rotation speed of a pump side to be higher than the rotation speed of a turbine side.

19. The electrical drive unit of claim 16, wherein the torque converter is configured to operate in a slip mode configured to allow rotation speed of a pump side to be higher than the rotation speed of a turbine side.

20. The electrical drive unit of claim 16, further comprising an axle mechanically coupled to the output shaft.

* * * * *